(12) United States Patent
Geer

(10) Patent No.: US 9,097,007 B1
(45) Date of Patent: Aug. 4, 2015

(54) PANEL ASSEMBLY

(71) Applicant: North Carolina State University, Raleigh, NC (US)

(72) Inventor: Kayla L. Geer, Zelienople, PA (US)

(73) Assignee: North Carolina State University, Raleigh, NC (US)

(*) Notice: Subject to any disclaimer, the term of this patent is extended or adjusted under 35 U.S.C. 154(b) by 0 days.

(21) Appl. No.: 14/268,095

(22) Filed: May 2, 2014

(51) Int. Cl.
*E04C 2/32* (2006.01)
*E04B 2/74* (2006.01)
*B32B 29/08* (2006.01)
*B32B 3/28* (2006.01)

(52) U.S. Cl.
CPC .............. *E04B 2/7407* (2013.01); *B32B 3/28* (2013.01); *B32B 29/08* (2013.01); *E04B 2/7455* (2013.01); *E04B 2002/7461* (2013.01); *E04B 2002/7481* (2013.01); *E04C 2/32* (2013.01); *E04C 2/322* (2013.01)

(58) Field of Classification Search
CPC ......... B32B 29/08; B32B 3/28; E04B 2/7455; E04B 2002/7481; E04C 2/322; E04C 2/32
USPC ........ 52/271, 270, 311.2, 762, 775, 284, 281, 52/276, 783.1, 783.11, 779; 428/185, 182, 428/183; 256/65.1, 65.16, 59
See application file for complete search history.

(56) References Cited

U.S. PATENT DOCUMENTS

| | | | |
|---|---|---|---|
| 2,809,017 A * | 10/1957 | Wong | 256/73 |
| 3,034,610 A | 5/1962 | Lynch | |
| 3,213,585 A | 10/1965 | Harry | |
| 3,350,828 A * | 11/1967 | Russell | 52/395 |
| 3,462,906 A | 8/1969 | Schroyer | |
| 3,495,368 A | 2/1970 | Krause | |
| 3,657,849 A | 4/1972 | Garton | |
| 4,055,923 A * | 11/1977 | Biebuyck | 52/235 |
| 4,257,204 A * | 3/1981 | Rieger | 52/395 |
| 4,467,578 A * | 8/1984 | Weinar | 52/281 |
| 4,719,731 A * | 1/1988 | Ravotti et al. | 52/239 |
| 4,923,076 A | 5/1990 | Weiss et al. | |
| 5,713,167 A * | 2/1998 | Durham et al. | 52/204.54 |
| 6,152,428 A * | 11/2000 | Simioni | 256/24 |
| 6,185,899 B1 * | 2/2001 | De Niet | 52/762 |
| 6,338,226 B1 | 1/2002 | Gauthier et al. | |
| 6,543,197 B2 | 4/2003 | Wetzel, III et al. | |
| 7,509,776 B2 | 3/2009 | Reisman | |
| 8,322,102 B2 | 12/2012 | Krieger | |
| 8,596,902 B2 * | 12/2013 | Mogar et al. | 403/388 |
| 2003/0029100 A1 | 2/2003 | Wetzel III et al. | |
| 2007/0071957 A1 | 3/2007 | Atkins et al. | |
| 2010/0132293 A1 * | 6/2010 | Voegele et al. | 52/402 |
| 2014/0087145 A1 | 3/2014 | Shelby et al. | |
| 2014/0087146 A1 * | 3/2014 | Shelby et al. | 428/182 |
| 2014/0087147 A1 | 3/2014 | Shelby et al. | |

FOREIGN PATENT DOCUMENTS

WO    2009019464    2/2009

OTHER PUBLICATIONS

Unistrut Application Showcase, "The Original Metal Framing System" retrieved from http://www.unistrut.US/DB/PDF1/Unistrut_AppShowcase.pdf dated Nov. 15, 2013 (64 pages).

* cited by examiner

*Primary Examiner* — Chi Q Nguyen
(74) *Attorney, Agent, or Firm* — Michael Best & Friedrich LLP

(57) ABSTRACT

A panel assembly includes a rail, a first panel snap-fit to the rail, a second panel snap-fit to the rail, and a plate coupled to the rail for selectively clamping the panels between the plate and the rail.

20 Claims, 5 Drawing Sheets

PANEL ASSEMBLY

FIELD OF THE INVENTION

The present invention relates to structural panel assemblies.

BACKGROUND OF THE INVENTION

Structural panels are commonly attached to frames for use in a wide variety of applications. However, attaching a structural panel to a frame often requires drilling or puncturing the panel and inserting a fastener through the panel and into the frame. This process is time consuming, and it can be difficult to accurately position the panel on the frame.

SUMMARY OF THE INVENTION

The invention provides, in one aspect, a panel assembly including a rail, a first panel snap-fit to the rail, a second panel snap-fit to the rail, and a plate coupled to the rail for selectively clamping the panels between the plate and the rail.

The invention provides, in another aspect, a panel assembly including a rail defining a longitudinal axis and including first and second undulating portions on opposite sides of the axis. The assembly further includes first and second panels, each including at least two layers of polymer material interconnected by a plurality of weld spots located at spaced intervals. The layers include undulations between adjacent weld spots. The undulations include a first set of undulations extending in a first direction parallel to the axis and a second set of undulations extending in a second direction orthogonal to the first direction. The first set of undulations on the first panel are snap-fit to the first undulating portion, and the first set of undulations on the second panel are snap-fit to the second undulating portion.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
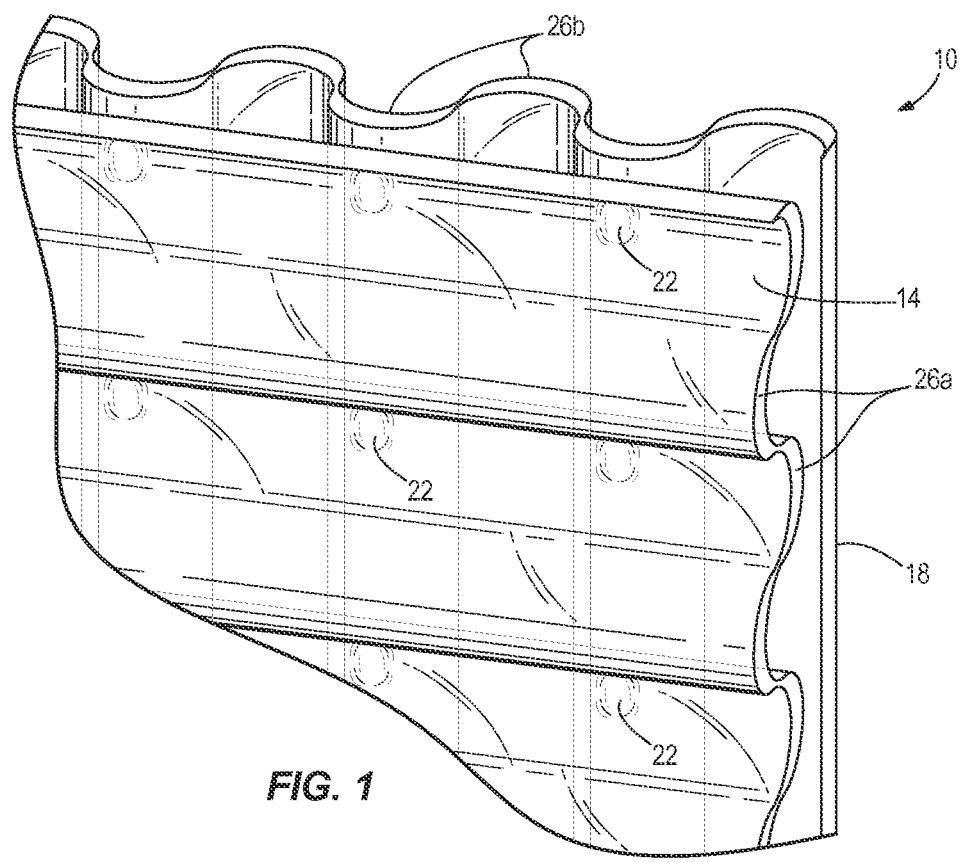
FIG. 1 is a perspective view of a portion of a structural panel.

FIG. 1 illustrates a portion of a structural panel 10 made of first and second interconnected sheets 14, 18 of a heat-shrinkable polymer material. The structural panels may be self-corrugating polymer panels like those described in U.S. Patent Application Publication Nos. 2014/0087145, 2014/0087146, and 2014/0087147, the entire contents of all of which are incorporated herein by reference.

Before undergoing a heat shrinking process, each of the sheets 14, 18 is uniaxially stretched to impart direction or orientation in the polymer chains. The sheets 14, 18 are oriented so that the stretched direction of the first sheet 14 is generally perpendicular to the stretched direction of the second sheet 18. Next, the sheets 14, 18 are interconnected at evenly spaced intervals using a radio frequency (RF) or other suitable welding process to create weld spots 22 that permanently bond the sheets 14, 18 at these intervals. When the sheets 14, 18 are subsequently heated, they shrink along orthogonal axes, thereby creating a first set of corrugations or undulations 26a in the first sheet 14 between adjacent weld spots 22 and a second set of undulations 26b in the second sheet 18 between adjacent weld spots 22. The undulations 26a, 26b extend in orthogonal directions due to the uniaxial stretching applied to the sheets 14, 18 before thermoforming. When in use, the structural panels 10 have already been thermoformed and have assumed the shape shown in FIG. 1.

Figure 2:
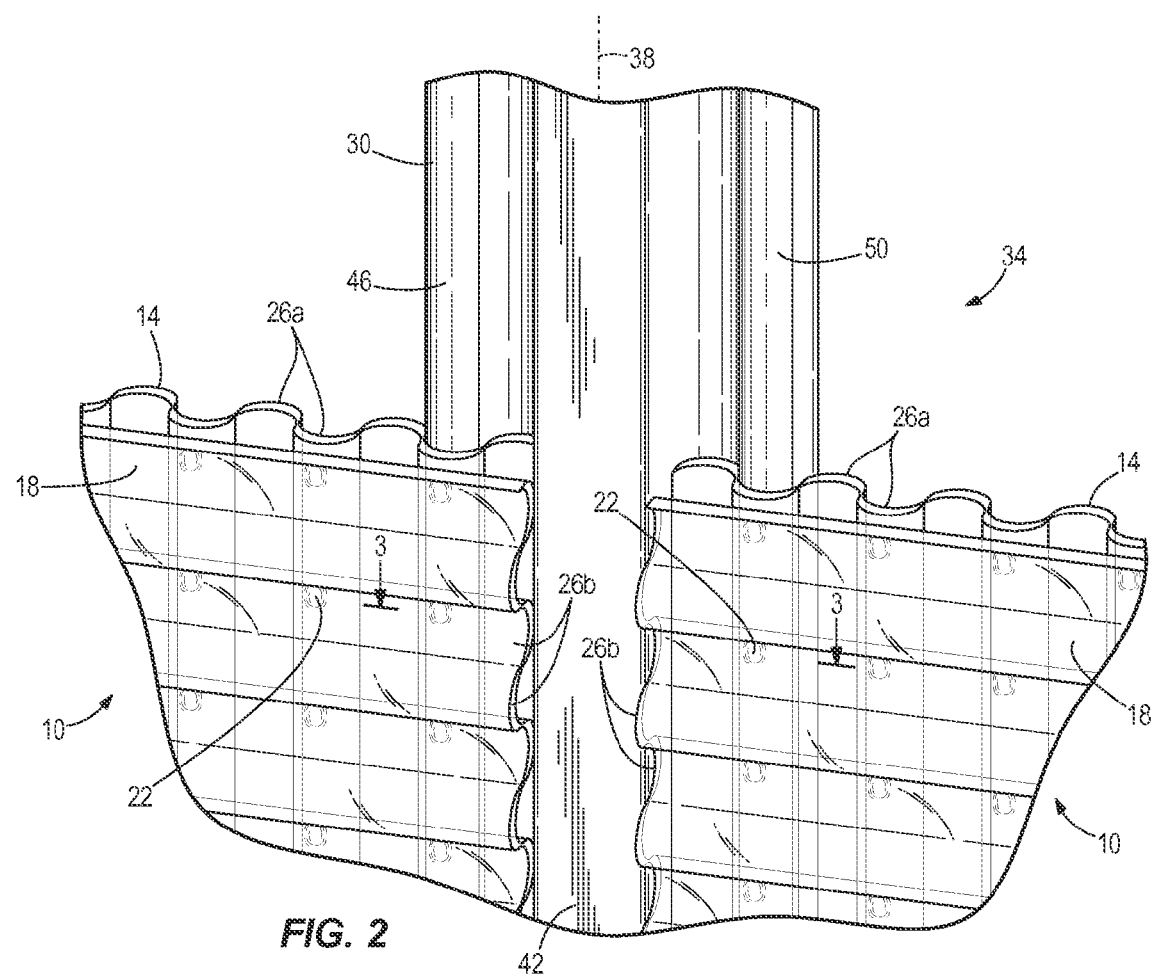
FIG. 2 is a perspective view of portions of two structural panels interconnected by a rail to form a panel assembly in accordance with an embodiment of the invention.
Figure 3:
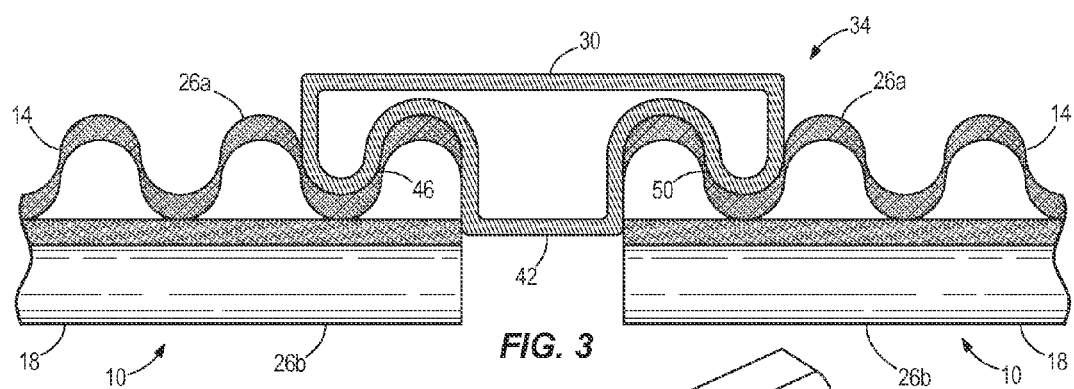
FIG. 3 is a cross-sectional view of the panel assembly of FIG. 2.

With reference to FIGS. 2 and 3, two or more structural panels 10 can be interconnected with a rail 30 to create a panel assembly 34. The rail 30 defines a longitudinal axis 38 and includes a center portion 42 and first and second undulating portions 46, 50 extending from the center portion 42 on opposite sides of the longitudinal axis 38. The rail 30 has a generally T-shaped cross-section (FIG. 3) and can be made of extruded aluminum or any other relatively strong and rigid material.

The undulating portions 46, 50 of the rail 30 are engageable with the undulations 26a, 26b on either side of the respective structural panels 10 using a snap-fit. As such, the structural panels 10 can be interconnected to form the panel assembly 34 simply by aligning the undulations 26a or 26b with the undulating portions 46, 50 of the rail 30, then pressing the panels 10 and rail 30 together. Although the rail 30 is illustrated herein as interconnecting two adjacent panels 10 in a generally coplanar orientation, in other embodiments the rail 30 may be adapted to join two panels 10 at an angle, such as a ninety degree angle, to form a corner joint.

In the illustrated embodiment, the first set of undulations 26a of each panel 10 is snap-fit to the respective undulating portions 46, 50 of the rail 30 such that the undulations 26a extend in a direction parallel to the longitudinal axis 38 of the rail 30. One or more seals (not shown) may be included between the rail 30 and the structural panels 10 to provide a watertight or airtight connection if desired.

Figure 4:
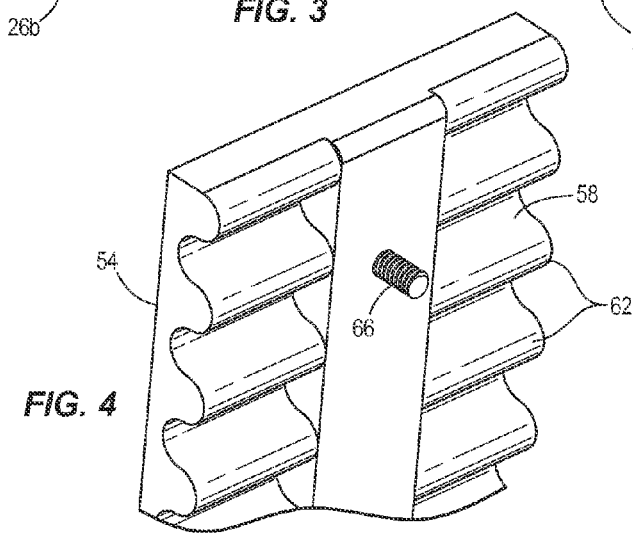
FIG. 4 is a perspective view of a clamping plate for use with the panel assembly of FIG. 2.
Figure 5:
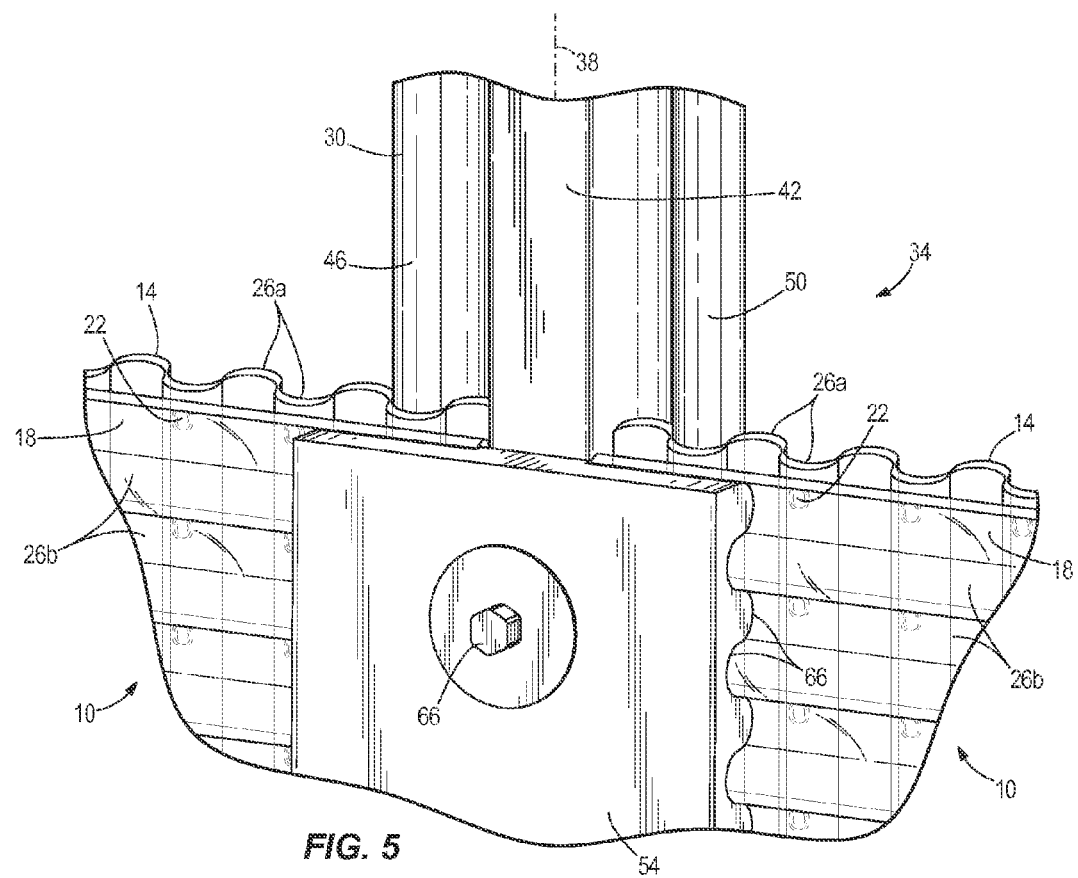
FIG. 5 is a perspective view of the clamping plate of FIG. 4 engaged with the panel assembly of FIG. 2.

With reference to FIGS. 4 and 5, one or more clamping plates 54 can be used to further strengthen the connection between the structural panels 10 and the rail 30. The clamping plate 54 includes a contoured side 58 having undulations 62 oriented to engage the undulations (e.g., the undulations 26b in the illustrated embodiment) of the panels 10 opposite the rail 30. In some embodiments, the undulations 62 engage the undulations 26b using a snap-fit. Alternatively, the undulations 62 on the clamping plate 54 may be oversized such that the clamping plate 54 is freely slidable along the undulations 26b. Once positioned, the clamping plate 54 is fastened to the rail 30 by a mechanical fastener 66 to clamp the panels 10 between the rail 30 and the plate 54 (FIG. 5). Although the clamping plate 54 is illustrated herein as interconnecting two adjacent panels 10 in a generally coplanar orientation, the clamping plate 54 may also be adapted to join two panels 10 at an angle, such as a ninety degree angle, to form a corner joint.

Figure 6:
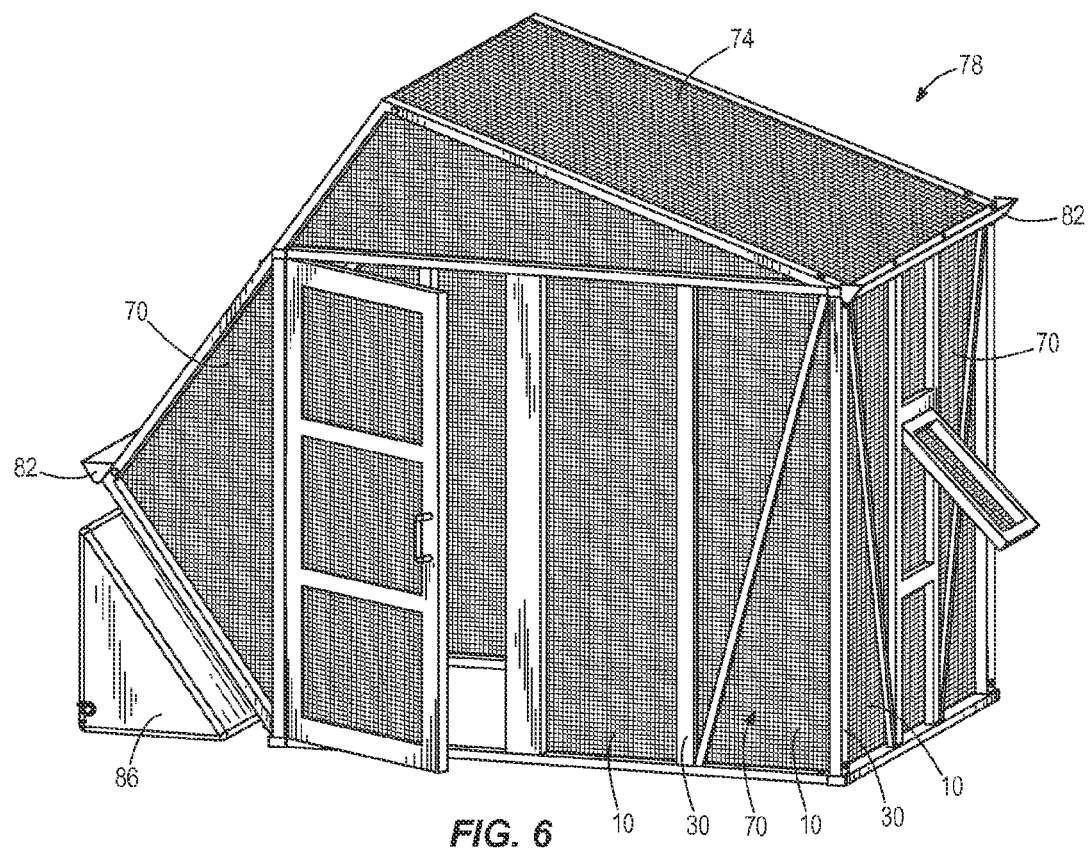
FIG. 6 is a perspective view of an exemplary enclosure that can be constructed using the panel assembly of FIG. 2.

FIG. 6 illustrates a plurality of structural panels 10 interconnected by rails 30 to form structural walls 70 and a roof 74 that collectively define an enclosure 78. In the illustrated embodiment, the enclosure 78 is a greenhouse; however, the enclosure 78 may be any other type of structure.

In addition to being easy to assemble, the structural panels 10 have other features and properties that make the panels 10 particularly well suited for forming the structural walls 70 and roof 74 of the greenhouse 78. For example, the polymer sheets 14, 18 are substantially translucent to allow sunlight to penetrate the greenhouse 78, and the orthogonal undulations 26a, 26b provide high strength and rigidity. In addition, air pockets located between the first and second sets of undulations 26a, 26b provide insulation. In the illustrated embodiment, the undulations 26a can also direct rainfall into gutters 82 located on the eves of the greenhouse 78, which may then direct the collected water into a rain barrel 86.

Various features of the invention are set forth in the following claims.

What is claimed is:

1. A panel assembly comprising:
   a rail;
   a first panel snap-fit to the rail;
   a second panel snap-fit to the rail; and
   a plate coupled to the rail for selectively clamping the first and second panels between the plate and the rail,
   wherein the first panel and the second panel each includes at least two interconnected layers of polymer material, wherein the layers are interconnected by a plurality of weld spots located at spaced intervals, wherein the layers include undulations between adjacent weld spots, and wherein the rail includes
   a first undulating portion engageable with the undulations of the first panel to snap-fit the first panel to the rail, and
   a second undulating portion engageable with the undulations of the second panel to snap-fit the second panel to the rail.

2. The panel assembly of claim 1, wherein the rail defines a longitudinal axis, and wherein the undulating portions are located on opposing sides of the longitudinal axis.

3. The panel assembly of claim 2, wherein the rail further includes a central portion disposed between the undulating portions, and wherein the plate is directly coupled to the central portion.

4. The panel assembly of claim 1, further comprising a fastener coupling the plate to the rail, wherein the fastener is adjustable to vary a clamping force applied to the panels by the plate.

5. The panel assembly of claim 1, wherein at least one of the first panel and the second panel is substantially translucent.

6. The panel assembly of claim 1, wherein the rail is a first rail and the plate is a first plate, the assembly further comprising
   a second rail snap-fit to the second panel;
   a third panel snap-fit to the second rail; and
   a second plate coupled to the second rail for selectively clamping the second and third panels between the second plate and the second rail.

7. The assembly of claim 1, wherein the first and second panels at least partially define a structural wall of an enclosure.

8. The panel assembly of claim 7, wherein the enclosure is a greenhouse.

9. A panel assembly comprising:
   a rail;
   a first panel snap-fit to the rail;
   a second panel snap-fit to the rail; and
   a plate coupled to the rail for selectively clamping the first and second panels between the plate and the rail,
   wherein the first panel and the second panel each includes at least two interconnected layers of polymer material, wherein the layers are interconnected by a plurality of weld spots located at spaced intervals, wherein the layers include undulations between adjacent weld spots, wherein the undulations include a first set of undulations extending in a first direction and a second set of undulations extending in a second direction orthogonal to the first direction, and wherein the rail includes
   a first undulating portion engageable with the first set of undulations of the first panel to snap-fit the first panel to the rail, and
   a second undulating portion engageable with the first set of undulations of the second panel to snap-fit the second panel to the rail.

10. The panel assembly of claim 9, wherein the rail defines a longitudinal axis, and wherein the first undulating portion and the second undulating portion are located on opposing sides of the longitudinal axis.

11. The panel assembly of claim 10, wherein the first direction is parallel to the longitudinal axis.

12. The panel assembly of claim 9, wherein the plate includes a contoured side engageable with the second set of undulations of the first panel and the second panel.

13. The panel assembly of claim 9, further comprising a fastener coupling the plate to the rail, wherein the fastener is adjustable to vary a clamping force applied to the panels by the plate.

14. The panel assembly of claim 9, wherein at least one of the first panel and the second panel is substantially translucent.

15. The panel assembly of claim 9, wherein the rail is a first rail and the plate is a first plate, the assembly further comprising
   a second rail snap-fit to the second panel;
   a third panel snap-fit to the second rail; and
   a second plate coupled to the second rail for selectively clamping the second and third panels between the second plate and the second rail.

16. The assembly of claim 9, wherein the first and second panels at least partially define a structural wall of an enclosure.

17. The panel assembly of claim 16, wherein the enclosure is a greenhouse.

18. A panel assembly comprising:
   a rail defining a longitudinal axis and including first and second undulating portions on opposite sides of the axis;
   first and second panels, each including at least two layers of polymer material interconnected by a plurality of weld spots located at spaced intervals, the layers including undulations between adjacent weld spots;
   wherein the undulations include a first set of undulations extending in a first direction parallel to the axis and a second set of undulations extending in a second direction orthogonal to the first direction;
   wherein the first set of undulations on the first panel are snap-fit to the first undulating portion, and wherein the first set of undulations on the second panel are snap-fit to the second undulating portion.

19. The panel assembly of claim 18, further comprising a plate coupled to the rail for selectively clamping the first and second panels between the plate and the rail.

20. The panel assembly of claim 19, wherein the plate includes a contoured side engageable with the second set of undulations of the first panel and the second panel.

* * * * *